United States Patent

Rubin et al.

[11] Patent Number: 5,833,176
[45] Date of Patent: Nov. 10, 1998

[54] BOWED SOLAR ARRAY

[75] Inventors: Charles P. Rubin, Los Angeles; John A Fabbri, Chatsworth; George N. Young, Los Angeles, all of Calif.

[73] Assignee: Hughes Electronics Corporation, Los Angeles, Calif.

[21] Appl. No.: 748,920

[22] Filed: Nov. 14, 1996

[51] Int. Cl.$^6$ .................................................. B64G 1/44
[52] U.S. Cl. ........................ 244/173; 244/168; 136/245
[58] Field of Search .................................. 244/173, 168; 136/244, 245

[56] References Cited

U.S. PATENT DOCUMENTS

| | | | |
|---|---|---|---|
| 3,559,769 | 2/1971 | Arbeitlang | 244/173 |
| 3,863,870 | 2/1975 | Andrews et al. | 244/173 |
| 4,451,828 | 5/1984 | Fuldner | 244/173 |
| 4,591,116 | 5/1986 | Guenther et al. | 244/168 |
| 5,244,508 | 9/1993 | Colozza | 136/245 |
| 5,296,044 | 3/1994 | Harvey et al. | 136/245 |
| 5,433,259 | 7/1995 | Faludy | 136/245 |

Primary Examiner—Joe Morano
Attorney, Agent, or Firm—Georann S. Grunebach; M. W. Sales

[57] ABSTRACT

A constrained solar array (24) for a satellite (20) and method for making the same are disclosed. The solar array (24) includes a superstructure (30) with solar cells (80) mounted thereon to provide power to a main satellite body (22) and instruments mounted thereon. A flexible tensile member (40) extends relative to the superstructure (30) and is placed under tension to place the solar array (24) in a constrained condition which reduces thermal transients in and increases the bending frequency of the solar array (24). Preferably, a pair of support arms (34,36) are cantilevered from the superstructure (30). The flexible tensile member (40) pulls upon the support arms (34,36) to apply bending moments to the superstructure (30) to maintain the solar array (24) in a distorted shape. The method includes heating one surface of the solar array (24) to thermally deform or bow the solar array (24) and then constraining the bowed solar array using a flexible tensile member (40) to prevent the solar array (24) from returning to its original configuration when the heat is removed from the solar array (24) during an eclipse.

13 Claims, 5 Drawing Sheets

BOWED SOLAR ARRAY

TECHNICAL FIELD

This invention relates to solar arrays on satellites and spacecraft and methods and systems for enhancing the thermal and mechanical dynamic behavior of the arrays.

BACKGROUND ART

Solar arrays are often provided on spacecraft and satellites to provide solar power to them. Once a satellite achieves a desired orbit, one or more solar arrays are typically deployed. The solar arrays are generally planar when deployed and have solar cells mounted on one side or surface thereof. The exposed solar cells are orientated to receive solar energy from the sun while the underlying support structure is hidden from the sun. The heating of solar cells adjacent to one surface of the support structure while the opposite surface of the support structure remains relatively cool can cause the solar array to thermally deform by bending away from the sun. When the satellite's orbit is hidden from the sun by the earth during an eclipse, the solar array including the support structure will cool to a more uniform temperature throughout and return to its original configuration. The transient motion that the solar array undergoes as it enters or exits the eclipse is called "thermal snap", a phenomenon that is sometimes difficult for the satellite control system to counteract.

Two fundamental difficulties with large solar arrays are their inherent low stiffness and their susceptibility to motion caused by thermal transients. These attributes can have significant effects on the satellite control system design. These characteristics are particularly important in low earth orbiting (LEO) satellites used for remote sensing due to the need for extremely stable platforms required by many of the on-board instruments. The thermal motion problem is also intensified in LEO due to the very short penumbra times compared to geosynchronous orbits thus amplifying the transient disturbance or thermal snap phenomenon.

Structures have been provided which mitigate the thermal snap phenomenon as well as stiffen the solar arrays. For example, backbone structures have been utilized which deploy or unfold with a solar array. Individual backbone members are mounted on the back of solar panels and then lock together to form a column-like member. Once extended, the backbone structure significantly stiffens the basic array. The backbone structure is hidden by the solar cells from exposure to the sun. Accordingly, the magnitude and rate of change of the thermal transient on the backbone structure is reduced and the magnitude of thermal snap is correspondingly reduced.

Another alternative is the utilization of highly flexible, sheet-like arrays which are deployed by a boom structure. The boom structure places high tension across the solar array to gain the desired stiffness. Thermal shadowing or hiding of the boom structure again reduces the thermal transients in the boom structure.

Both of these known implementations, however, add significant complexity to the solar arrays, as well as to their manufacture and deployment mechanism. Furthermore, both the backbone and boom structures are expensive and add significant weight to the spacecraft payload.

SUMMARY OF THE INVENTION

A bowed solar array for a satellite and method of constructing the same are disclosed. The solar array is preferably a flat array comprised of multiple solar panels having solar cells used to supply power to a satellite. The solar panels interlock to form an overall planar superstructure. The solar array is constrained in a distorted or bowed shape, preferably by a flexible tensile member such as a cable, cord or wire suspended between spaced apart support arms to increase bending stiffness and thus the bending frequency of the solar array. Concurrently, this constraint reduces the thermal motion response as the solar array enters and exits an ellipse.

The present invention overcomes problems of large thermal transients and associated motion and inherent low stiffness by constraining a solar array in its most distorted shape due to thermal deformation using a flexible tensile member extending between the two ends of the array. One or more support arms preferably are cantilevered from the superstructure on which the solar cells are mounted. The flexible tensile member pulls the support arms together to place the superstructure in the constrained condition. Analogously, the solar array becomes a bow and the tensile member serves as a bow string. The bowed or constrained condition is automatically achieved on orbit by using a tensioning device which allows the tensile member to become shortened between the support arms, i.e., take up slack as the solar array deforms due to thermal loading. The tensioning device prevents the tensile member from lengthening when the solar array tries to return to its undeformed shape once the thermal loading is removed. Consequently, once the bowed shape is achieved, the solar array remains in that configuration.

It is the primary object of the present invention to provide an improved solar array for a spacecraft or satellite, particularly an array which is lighter in weight, less expensive to produce, less complex in its design and produces less transient solar induced motion forces to the spacecraft. It is another object of the present invention to provide a constrained solar array mechanism and method for utilizing the same which are simpler and which will result in a lighter weight and lower cost mechanism than used with conventional stiffened solar arrays. It is an additional object of the present invention to provide a method for retrofitting existing solar array designs to provide reinforcement and stiffness to them and reduce thermal snap response.

It is a further object of the present invention to provide a simple way to enhance the thermal/dynamic behavior of flat panel solar arrays in satellite applications having high power and stringent pointing/stability requirements. An additional object of the present invention is to increase the stiffness of a solar array using a flexible tensile member to place the solar array in a bowed and constrained condition thus simplifying the design of the corresponding satellite control system.

It is yet another object to constrain a solar array in a bending condition so that the response to thermal loading on the solar array causes little change in solar array deformation and thus substantially reduces disturbances transferred to a main satellite body. A further object is to provide a solar array having a superstructure with a cantilevered support arm at each end and utilizing a flexible tensile member to pull on a free end of each support arm to stiffen the solar array.

These and other objects and purposes are met by the present inventive solar array including a unique bowing and constraining mechanism, as summarized above and as defined in more detail below in the following description, as well as in the accompanying drawings and appended claims.

BEST MODE FOR CARRYING OUT THE INVENTION

Figure 1:
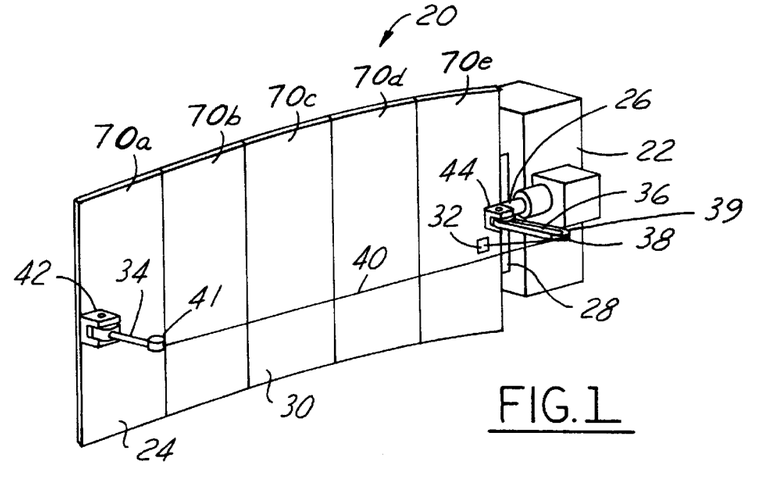
FIG. 1 is a rear perspective view of a satellite utilizing a constrained solar array employing a flexible tensile member in accordance with the present invention.
Figure 7:
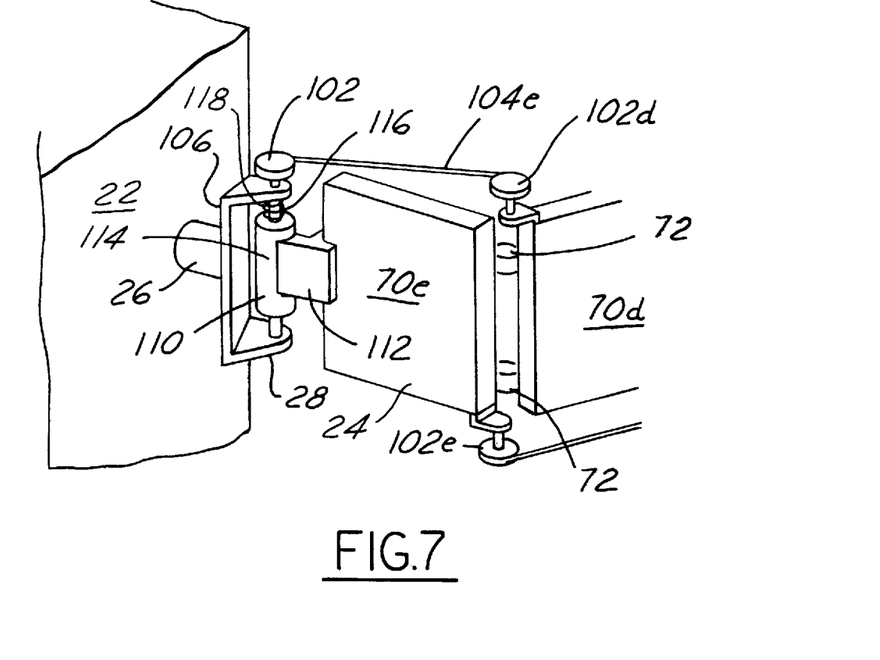
FIG. 7 is an enlarged view of a solar wing actuator deploying a solar panel from a main satellite body.

FIG. 1 depicts an exemplary embodiment of a satellite 20 comprising a spacecraft or main satellite body 22 and a fully deployed and constrained solar array 24 provided in accordance with the present invention. Satellite body 22 is a conventional spacecraft including communication apparatus such as satellite dishes. A bar 26 and bracket 28, as best seen in FIG. 7, connect solar array 24 to main satellite body 22.

Solar array 24 includes a superstructure 30, a tensioning device 32, first and second support arms 34 and 36 and a flexible tensile member 40, such as a cable, wire or strand of material. Support arm 36 has a ring 38 at a free distal end 39 through which cable 40 slidably passes. Cable 40 affixes to a free distal end 41 on support arm 34, passes through ring 38 and is connected to tensioning device 32.

First and second spring-biased locking hinges 42 and 44, respectively, pivotally mount support arms 34 and 36 to superstructure 30. Locking hinges 42 and 44 are spring loaded to extend and lock first and second support arms 34 and 36 generally perpendicular to superstructure 30 when a release mechanism, such as a conventional pyrotechnic device (not shown), is activated by a control system located on main satellite body 22. One skilled in the art of satellite deployment will appreciate that a variety of other deployment devices may be used as well to release and lock support arms 34 and 36 in place.

Figure 6:
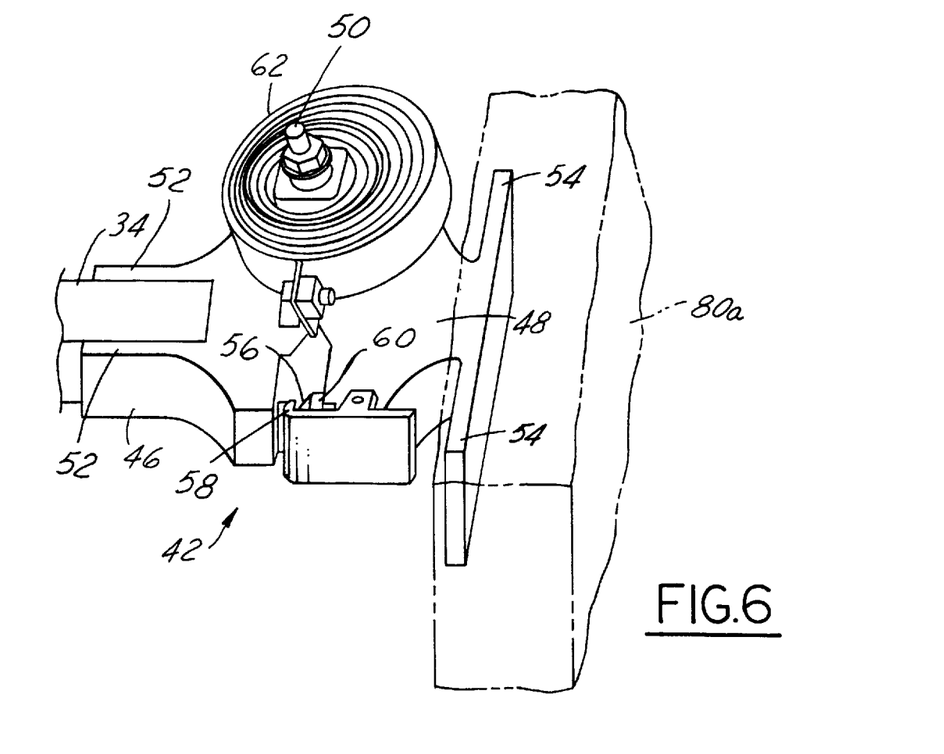
FIG. 6 is a perspective view of a locking hinge used to deploy support arms.

Spring-loaded locking hinge 42 is shown in greater detail in FIG. 6. Locking hinge 44 is generally identical in form and function. Hinge 42 includes first and second hinge members 46 and 48 which are connected by a pivot pin 50 and have respective parallel flanges 52 and flat flanges 54. Support arms 34 or 36 are held between flanges 52 while flat flanges 54 mount to superstructure 30. First hinge member 46 includes a hook 56 and second hinge member 48 has a latch 58 which interlock with one another when hinge 42 is fully opened. A hard stop 60 on second hinge member 48 bears upon hook 56 when hinge 42 is latched in its full open position.

A coiled leaf deployment spring 62 biases hinge members 42 and 44 of hinge 42 to the open position as shown in FIG. 6. Hinge 42 is locked in place until released such as by using a pyrotechnic bolt (not shown) which can be exploded at an appropriate time by the control system on satellite body 22. Other conventional release mechanisms could also be used to release hinge 42 at a desired time.

Figure 2:
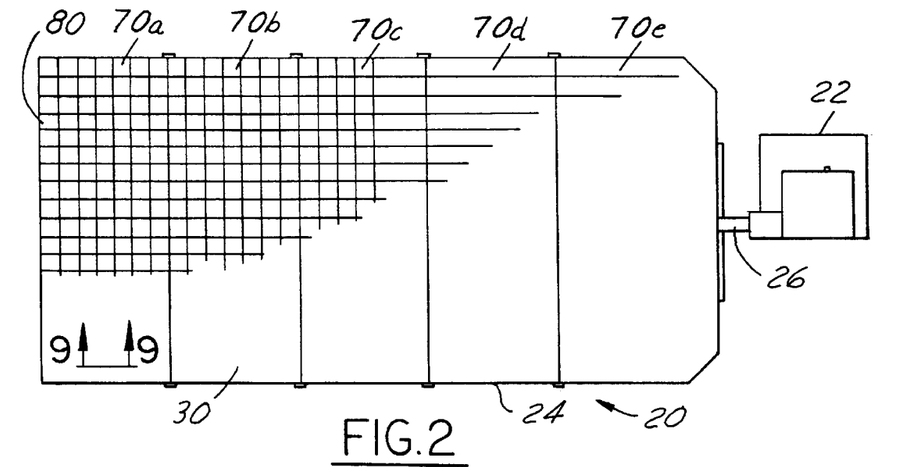
FIG. 2 is a front view of the satellite of FIG. 1.
Figures 4, 5:
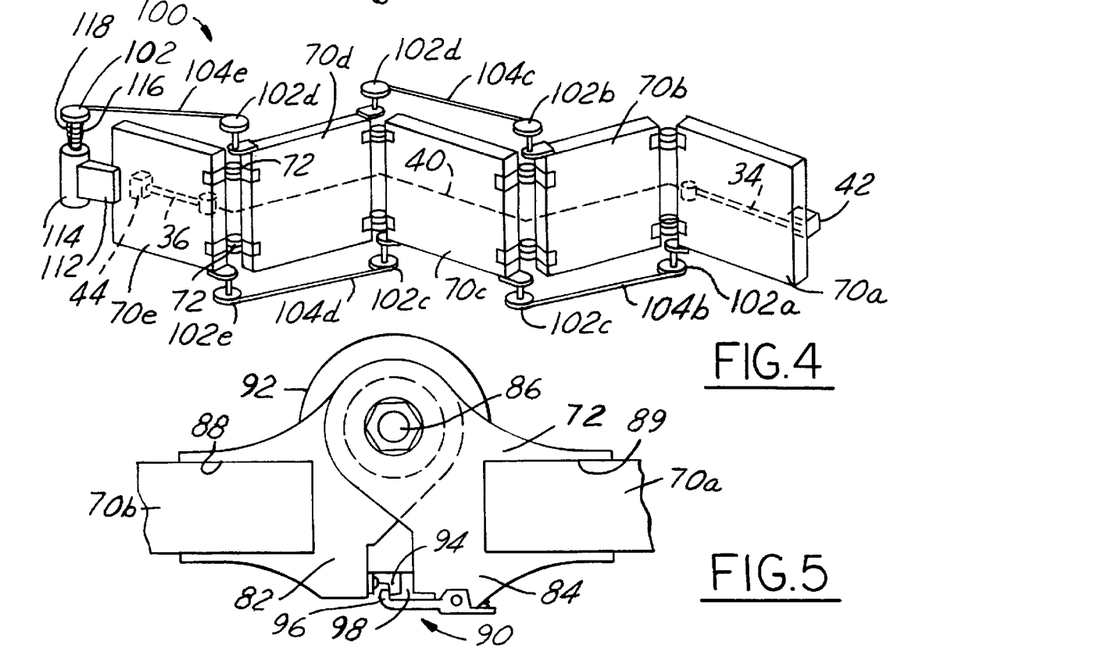
FIG. 4 is a schematic perspective view of the solar array including a cable system used to synchronize the deployment of solar array panels.
FIG. 5 is an enlarged top view of a spring-biased locking hinge used to lock adjacent solar panels together in a planar orientation.

Referring back to FIGS. 1 and 2, superstructure 30 includes five solar panels 70a–e which are locked together in a plane by spring-biased locking hinges 72, as best seen in FIGS. 4, 5 and 7. Locking hinges 72 are generally similar in operation to locking hinges 42 and 44 used to releasably deploy support arms 34 and 36.

Figure 9:
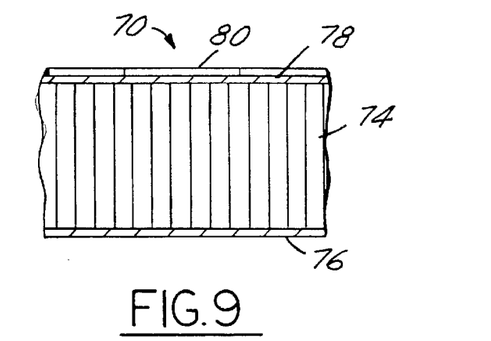
FIG. 9 is an enlarged fragmentary sectional view of a solar panel from FIG. 2.

The cross-section of a panel 70 is shown in FIG. 9. A bonded honey-comb substructure 74 is sandwiched between multiple plies forming rear and front face sheets 76 and 78. Solar cells 80 are adhesively secured to front face sheet 78.

Referring now to FIG. 5, a hinge 72 is shown pivotally securing together adjacent solar panels 70a and 70b. Hinge 72 includes first and second hinge members 82 and 84 which are pivotally connected by a pivot pin 86. Hinge members 82 and 84 have respective channels 88 and 89 in which solar panels 70 are positioned. Hinge 72 has a locking mechanism 90 and a coiled leaf spring 92 like that described above with respect to locking hinge 42. Locking mechanism 90 includes a hook 94, a latch 96 and a hard stop 98. When solar panels 70 are swung fully open, hinges 72 will lock with superstructure 30 taking on a flat plate-like characteristic.

A deployment synchronizing system 100 is shown in FIGS. 4 and 7 which synchronizes the movement of solar panels 70a–e as they deploy into their interlocking positions. Cable synchronizing system includes disks 102, 102a, 102b, 102c, 102d and 102e, cables 104b–e connecting between the disks, and a solar array drive 110. Solar array drive 110 includes a bracket 112, a rotor/damper 114, and a shaft 116 to which disk 102 is affixed and a drive spring 118. Disks 102a–e are affixed to their respective solar panels 70a–e and disk 102 to bracket 28.

Solar array drive 110 and panel 70e are held adjacent spacecraft body 22 until solar array 24 is to be deployed. Once release devices holding solar array 24 to spacecraft body 22 are activated, such as by using pyrotechnic devices which are preferably disposed on body 22, deployment is initiated by the spring energy of spring 118 of the solar array drive 110 and springs 92 of panel hinges 72. Motion of individual panels 70 is synchronized by the cable/disk arrangement of deployment synchronizing system 100. The spring energy in the panel hinges 72 tries to deploy each panel independently. Panel motion is constrained, however, by the amount each disk can unwind cable therefrom or wind up cable thereon. This, in turn, is controlled by the motion of panel 70e and how much it causes cable 40 to unwind from the fixed disk 102 as bracket 112 swings away from body 22. Rotor/damper 114 limits the speed of deployment. Note in FIG. 4 that cable 40 will be loosely positioned adjacent panels 70a–e until after the solar array 24 is fully deployed.

Figure 8:
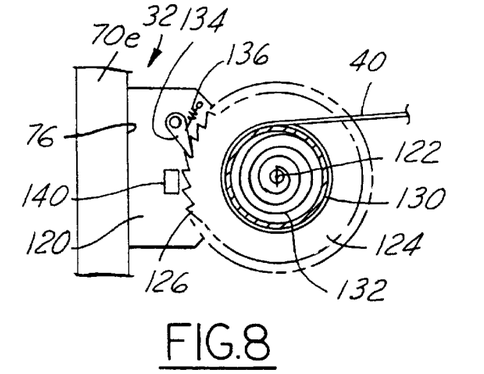
FIG. 8 is a side view of a tensioning device used to tension and collect a flexible tensile member of the solar array.

Tensioning device 32 is best seen in FIG. 8. A mounting plate 120 secures to rear face sheet 76 of solar panel 70e. A shaft 122 pivotally mounts a rachet wheel 124, having external teeth 126, to mounting plate 120. Ratchet wheel 124 includes a spool 130 for taking up cable 40. A coiled leaf spring 132 biases spool 130 to take up cable 40. A pawl 134 engages teeth 126 to prevent spool 130 from unwinding and releasing the tension on cable 40 after solar array 24 is fully deployed. A spring 136 holds pawl 134 in engagement with teeth 126. A pin and pyrotechnic release device 140 holds ratchet wheel 124 against rotation until solar panels 70 and support arms 34 and 36 are fully deployed and locked in place. Then release device 140 is activated allowing tensioning device 32 to take up cable 40.

Figure 3A:
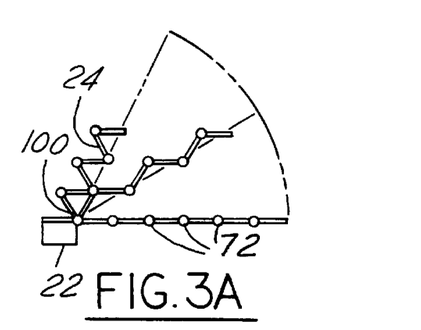
FIGS. 3A–D are schematic views of the solar array deploying from a satellite body.
Figure 3B:
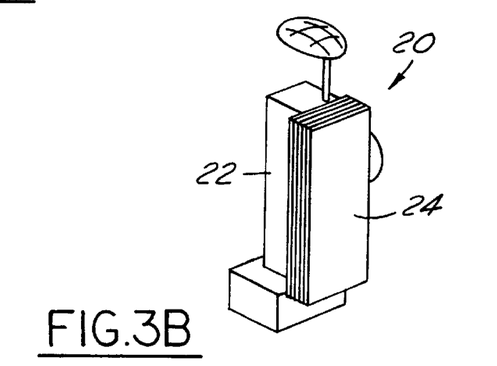
Figure 3C:
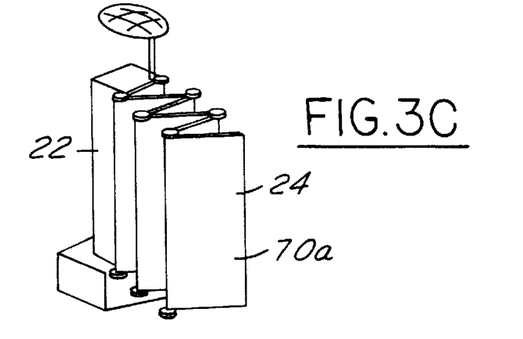
Figure 3D:
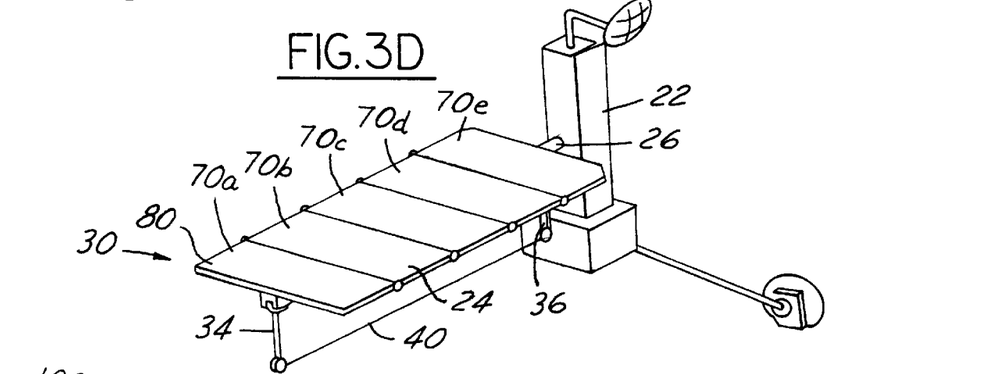

FIGS. 3A–D generally depicts the deployment of solar array 24 after the satellite is positioned in its orbit. FIG. 3A is a schematic illustrations of such deployment. FIG. 3B is a perspective view showing solar array 24 adjacent the satellite body 22 before array 24 is deployed. FIG. 3C shows solar array 24 in partial deployment. FIG. 3D depicts array 24 when it is fully deployed.

A control system on main body 22 actuates release mechanisms to release solar array 24 from main satellite body 22. Solar array 24 unfolds preferably utilizing deployment synchronizing system 100 and the spring force provided by springs 92 of hinges 72 as described above until hinges 72 interlock solar panels 70 into a coplanar configuration. Bar 26 rotates solar array 24 relative the satellite body 22 (as shown in FIG. 3C and FIG. 3D) in order to position solar cells 80 toward the sun. Next, deployment devices 42 and 44 are activated to rotate and lock support arms 34 and 36 in place extending generally perpendicular to superstructure 30. Finally, tensioning device 32 is activated releasing ratchet wheel 124 thereby preventing cable 40 from further releasing from spool 130.

As the sun heats solar cells 80, front face sheet 78 of the adjacent superstructure 30 is likewise heated while the opposite rear face sheet 76 remains relatively cool in comparison. Accordingly, superstructure 30 bends concavely away from the sun, as indicated in FIG. 1. Any slack in cable 40 is taken up by spool 130 as superstructure 30 bends. Pawl 134 prevents rachet wheel 124 and spool 130 from rotating and releasing more cable 40. Thus once solar array 24 is in its constrained and bowed configuration, as seen in FIG. 1, solar array 24 is preferably permanently held in this constrained or bowed position. Consequently, front face sheets 78 are maintained in tension while rear sheets 86 are in compression.

When the orbit of satellite 20 places satellite 20 behind the earth, solar array 24 rapidly cools. Consequently, superstructure 30 of solar array 24 tries to return to its undeformed shape. However, as ratchet wheel 124 is prevented from unspooling by pawl 134, cable 40 cannot unwind from spool 130. The dissipating thermal load on superstructure 30 tries to return solar array 24 to its original configuration. However, this return deformation or motion is countered by the increase in tension in cable 40. Therefore, cable 40 stretches or elongates only slightly allowing for only a small return movement to superstructure 30 of solar array 24. Consequently, the thermal snap phenomenon is controlled by cable 40 retaining solar array 24 into its bowed or constrained shape.

When satellite 20 is again exposed to the sun's rays, superstructure 30 will naturally tend to return to its fully bowed or concaved shape. This reduces a portion of the tensile load on cable 40. However, the shape of superstructure 30 changes very little.

Hence, the magnitude of solar array 24 movement is greatly reduced along with the transfer of loads and motions, due to solar array 24 movement, across bar 26 and into satellite body 22. This reduces the difficulty of the satellite control system in controlling the orientation or pointing of equipment on satellite body 22, which in many cases must be accurately aimed at selected locations on the earth. Therefore, the control system of satellite 20 is simplified due to the increased stiffness of solar array 24 and the reduction in thermal snap phenomenon due to the constraint provided by cable 40.

Figure 10A:
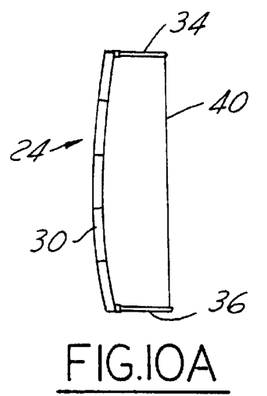
FIGS. 10A–C are respective top schematic views of solar array embodiments utilizing two, one and no support arms to assist in constraining respective superstructures of solar arrays.
Figure 10B:
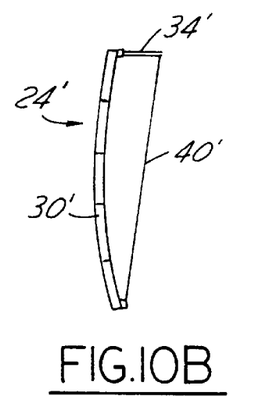
Figure 10C:
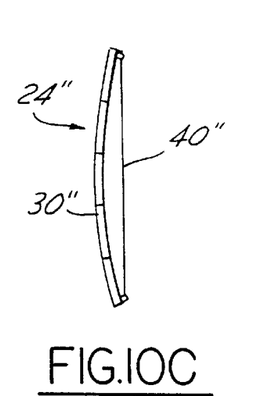

FIG. 10A schematically depicts the first preferred embodiment of solar array 24 having first and second support arms 34 and 36. Cable 40 extends between support arms 34 and 36 and is tensioned and collected by tensioning device 32 (not shown). FIG. 10B illustrates a second embodiment of a constrained solar array 24' having superstructure 30'. A first support arm 34' is cantilevered from superstructure 30' with a cable 40' tautly extending between a distal end on support arm 34' and one end of superstructure 30'. In the embodiments of FIGS. 10A and B, the superstructure, flexible tensile members and support arms form an open frame on the respective solar arrays. Finally, FIG. 10C shows a third embodiment of a solar array 24" where a tensile flexible member 40" extends between and directly constrains the end portions of a superstructure 30". In each of the embodiments a flexible tensile member is used to stiffen a solar array to increase the bending frequency of the respective solar array while minimizing thermal snap phenomenon on the solar array. Consequently, control system design for an associated satellite is simplified.

Figure 11:
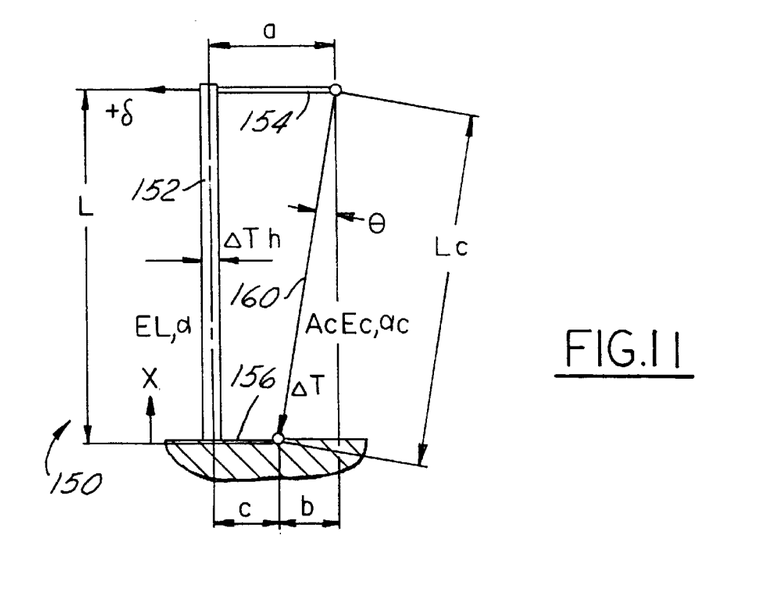
FIG. 11 is a schematic model of a solar array with a pair of opposing support arms and a variety of specified parameters.

FIG. 11 illustrates a mathematical model 150 of a superstructure or beam 152 having a rigid first support arm 154 and a generally rigid second support arm 156. A cable 160 joins arms 154 and 156. Calculations below will demonstrate the efficacy of using a super-structure or beam with a constraint provided by a flexible tensile member to increase the beam's bending frequency and to reduce thermal distortion.

The mode shape $\phi(x)$ of vibrating beam 152 is given by:

$$\phi(x)=A_1 \sin(\beta x)+A_2 \cos(\beta x)+A_3 \sin h(\beta x)+A_4 \cos h(\beta x) \quad (1)$$

where $\beta^4=m\omega^4/EI$. $A_1$, $A_2$, $A_3$ and $A_4$ are constants, E=the modulus of elasticity for beam 152, m=mass per unit length of the beam, x=position along beam 152 from its cantilevered end, and I=bending moment of inertia for beam 152. The boundary conditions for the configuration shown in FIG. 11 are:

$$\phi(x)=\phi'(x)=0, \quad (2)$$

$$EI\phi''(L)=M(L)=-aF_c \cos\theta, \quad (3)$$

$$EI\phi'''(L)=V(L)=-F_c \sin\theta \quad (4)$$

where $\theta$=angle between cable 160 and the vertical, and L=length of beam 152. The beam is clamped at x=0 and sees moment and shear loads from the cable at x=L.

The force $F_c$ in the cable is a function of the cable elongation $\delta_c$, which results from the rotation and displacement of the beam at x=L $$F_c=A_cE_c\delta_c/L_c=(A_cE_c/L_c)[a\phi''(L)\cos\theta-\phi(L)\sin\theta] \quad (5)$$

where $A_c$=cross-sectional area of the cable, $E_c$=modulus of elasticity of the cable, and $L_c$=length of the cable.

Applying these conditions to the mode shape equation (1), and noting that $\sin\theta=b/L_c$ and $\cos\theta=L/L_c$, this results in the following equation in terms of $\beta L$:

$$1 + c \cdot ch + \left(\frac{L}{L_c}\right)^2 \left(\frac{A_c E_c}{EI}\right) \cdot \left[ -\frac{a^2}{\beta L}(s \cdot ch + c \cdot sh) - \frac{ab}{(\beta L)^2}(2s \cdot sh) + \frac{b^2}{(\beta L)^3}(s \cdot ch - c \cdot sh) \right] = 0 \quad (6)$$

where for brevity $s=\sin(\beta L)$, $c=\cos(\beta L)$, $sh=\sinh(\beta L)$, and $ch=\cosh(\beta L)$. This equation can be solved numerically for $\beta L$ and the frequency can then be found from the original definition of $\beta$:

$$f = \frac{(\beta L)^2}{2\pi} \sqrt{\frac{EI}{mL^4}} \quad (7)$$

Several limiting cases are of interest. For simplicity, assume small $\theta (L/L_c \approx 1)$:

1. $a=b=c=0$ (pure cantilever; i.e. arms 154 and 156 have no length) where a=length of arm 154, b=length of arm 156, and c=offset from end of arm 154 relative to the end of arm 156. The equation for $\beta L$ reduces to $1+c \cdot ch=0$, with minimum solution $\beta L=1.875$.
2. $a=0$, i.e. $b=-c$ (zero offset at beam tip). The equation for $\beta L$ reduces to $(1+c \cdot ch)+\gamma_b(s \cdot ch-c \cdot sh)/(\beta L)^3=0$, where $\gamma_b=A_c E_c b^2/EI$. In the limit as $\gamma_b \to \infty$, the last term dominates and so $s \cdot ch-c \cdot sh=0$. The minimum solution is $\beta L=3.927$, and the frequency relative to a pure cantilever is $(3.927/1.875)^2=4.385$. This is the same result as for a clamped/simply-supported beam.
3. $b=0$, i.e. $a=c$ (equal offsets, cable 160 is parallel to beam 152). The equation for $\beta L$ reduces to $(1+c \cdot ch)+\gamma_a(s \cdot ch+c \cdot sh)/\beta L=0$, where $\gamma_a=A_c E_c a^2/EI$. In the limit as $\gamma_a \to \infty$, the last term dominates and so $s \cdot ch-c \cdot sh=0$. The minimum solution is $\beta L=2.365$, and the frequency relative to a pure cantilever is $(2.365/1.875)^2=1.591$. This is the same result as for a clamped/guided beam.
4. $c=0$, i.e. $a=b$ (zero offset at base). In the limit as $\gamma_a \to \infty$ the last term dominates and the minimum solution is $\beta L=1.945$. The frequency relative to a pure cantilever is $(1.945/1.875)^2=1.076$.

Figure 12:
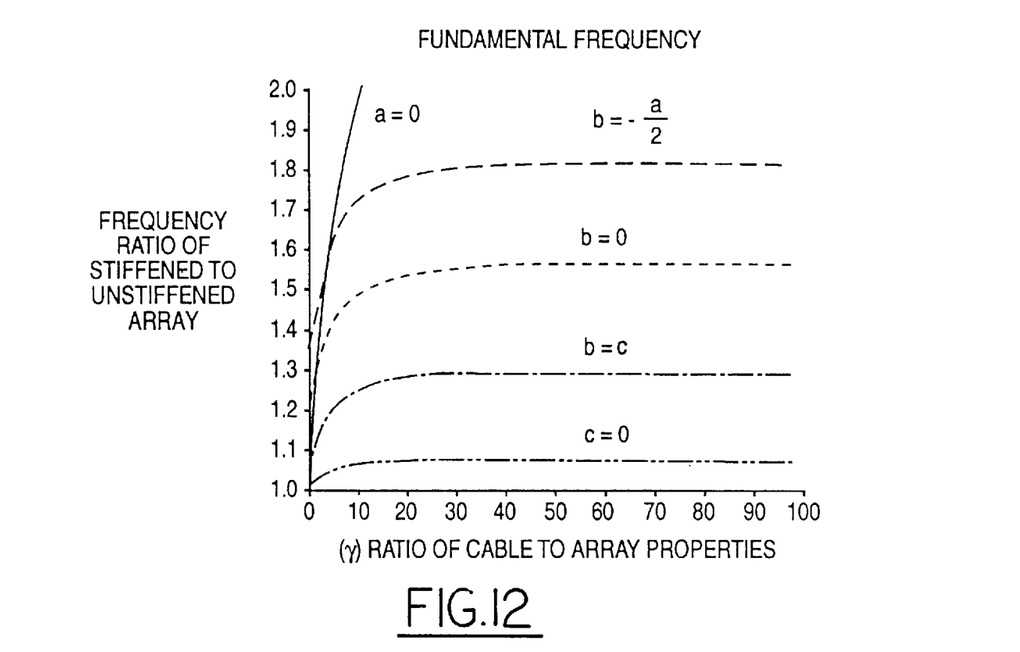
FIG. 12 is a graph of frequency ratio versus γ, a ratio of cable to array properties, for the solar array of FIG. 11.

These results are shown in FIG. 12 (where the independent variable $\gamma$ refers to $\gamma_a$ except for the case a=0 where it refers to $\gamma_b$). The curves in FIG. 12 show the effectiveness of various configurations on the frequency of the array. The frequency ratio is the ratio of the stiffened array to that of an unstiffened array. The least effective implementation is with c=0, i.e. with a support arm at the array tip but zero offset at the base, since the frequency increase is less than 10%. The remaining curves indicate that the effectiveness increases as the length of the lower arm increases. The most effective configuration is with b=-a/2 which makes the base support arm 156 1.5 times the length of the upper arm 154. In this case the frequency rise is greater than 80% for values of $\gamma$ greater than 30. $\gamma$ is a ratio of the offset cable stiffness properties relative to panel or beam bending stiffness. Accordingly, the greater the offset and the stiffer the cable, the higher the value of $\gamma$.

The strain energy U due to an applied temperature gradient $\Delta T/h$ in the beam and a temperature differential $\Delta T$ in the cable is:

$$U = \int_0^L M\left(\frac{M}{2EI} + \alpha \frac{\Delta T}{h}\right) dx + \left(\frac{L_c}{A_c E_c} + \frac{L\cos^2\theta}{AE}\right) F_c^2 + \alpha_c L_c \Delta T F_c \quad (8)$$

where $M=(x \cdot \sin\theta - a \cos\theta)F_c$, $\sin\theta=b/L_c$, $\cos\theta=L/L_c$, $\alpha$=thermal coefficient of expansion in the beam, and $\alpha_c$=thermal coefficient of expansion in the cable.

Let $F_c$ be the redundant load and set $\partial U/\partial F_c=0$. This leads to the following expression:

$$F_c = \frac{(\alpha\Delta T/h)\left(a - \frac{b}{2}\right) - (L/L_c)^2 \alpha_c \Delta T}{\frac{1}{EI}\left(\frac{b^2}{3} - ab + a^2\right) + \frac{(L/L_c)^2}{A_c E_c} + \frac{1}{AE}} \quad (9)$$

Defining $c=a-b$, this can be written more naturally as $$F_c = \frac{(\alpha\Delta T/h)\left(\frac{a+c}{2}\right) - (L/L_c)^2 \alpha_c \Delta T}{\frac{1}{3EI}(a^2 + ac + c^2) + \frac{(L/L_c)^2}{A_c E_c} + \frac{1}{AE}} \quad (10)$$

The unconstrained deflection at the tip of beam 152 due to a temperature gradient $-\Delta T/h$ is:

$$\delta_0 = -\frac{\alpha L^2}{2} \frac{\Delta T}{h} \quad (11)$$

When the cable is attached, the magnitude of the deflection due to a reverse gradient $+\Delta T/h$ is:

$$\delta_1 = \frac{\alpha L^2}{2} \frac{\Delta T}{h} - \left(\frac{ML^2}{2EI} + \frac{VL^3}{3EI}\right) \quad (12)$$

where $M=aF_c\cos\theta$ and $V=-F_c\sin\theta$ are the moment and shear due to the action of the cable.

Putting these results together, the ratio of constrained to unconstrained tip deflection is:

$$\frac{\delta_1}{\delta_0} = 1 - (a + 2c)\left\{ \frac{(L/L_c)\left(\frac{a+c}{2}\right) - \frac{\alpha_c L_c \Delta T}{\alpha L(\Delta T/h)}}{a^2 + ac + c^2 + 3EI\left[\frac{(L/L_c)^2}{A_c E_c} + \frac{1}{AE}\right]} \right\} \quad (13)$$

To consider some specific cases, let $1/AE=\alpha_c=0$ and assume small $\theta(L/L_c \approx 1)$:

1. $a=b=c=0$ (pure cantilever). By definition, $|\delta_1/\delta_0|=1$.
2. $a=0$, i.e. $b=-c$ (zero offset at tip). The deflection ratio is $|\delta_1/\delta_0|=1-\gamma b/(\gamma_b+3)=3/(\gamma_b+3)$, where $\gamma_b=A_c E_c b^2/EI$.
3. $b=0$, i.e. $a=c$ (equal offsets, cable parallel to beam). The deflection ratio is $|\delta_1/\delta_0|=1-\gamma_a/(\gamma_a+1)$, where $\gamma_a=A_c E_c a^2/EI$.
4. $c=0$, i.e. $a=b$ (zero offset at base). The deflection ratio is $|\delta_1/\delta_0|=1-(1/2)]\gamma/(\gamma+3)]=(\gamma/2+3)/(\gamma+3)$, where $\gamma=\gamma_a=\gamma_b$.

These results are shown in

Figure 13:
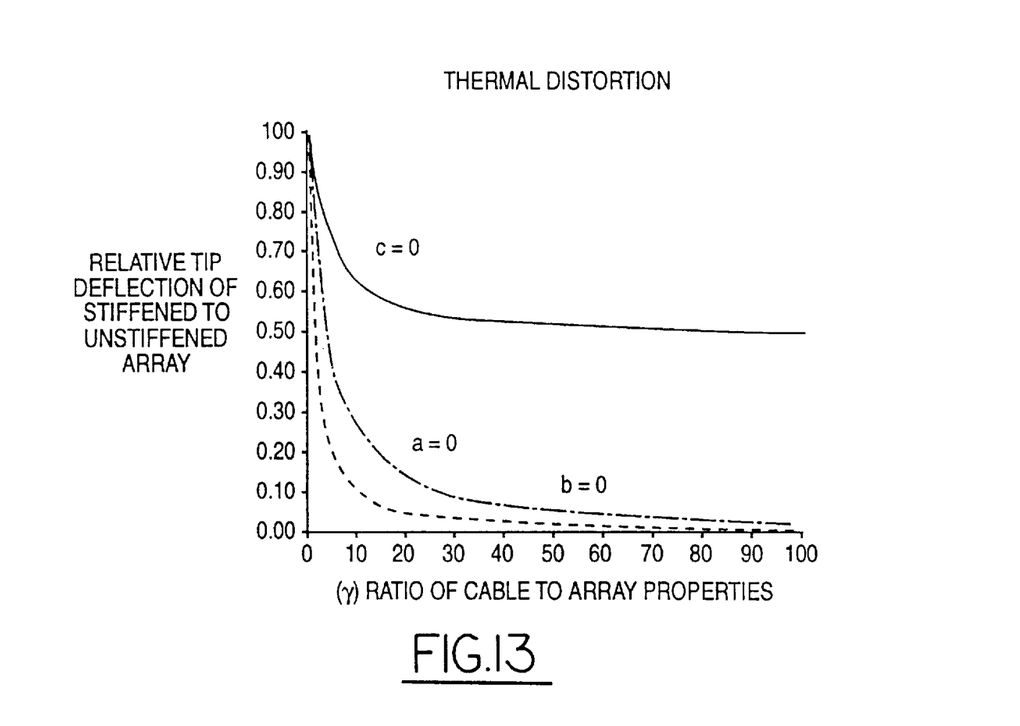
FIG. 13 is a graph of relative tip deflection under thermal loads versus γ, the ratio of cable to array properties, for the solar array of FIG. 11.

FIG. 13 (again, the independent variable $\gamma$ refers to $\gamma_a$ except for the case a=0, where it refers to $\gamma_b$). The curves in FIG. 13 show the effectiveness of various configurations on reducing the tip deflection due to thermal distortion relative to an unstiffened array. Similar to the effect on frequency, the least effective configuration is with c=0 which represents zero offset of the cable at the base of the array. The most effective configuration of those shown is with b=0 (i.e. both support arms of equal length) which leads to tip deflections that are less than 5% of an unstiffened array for values of $\gamma$ greater than 30. The configuration having a=0 (i.e. zero offset at the tip of the array but with a support arm at the base) also shows high affectivity with tip deflections greatly reduced but still generally twice as large as can be achieved with the b=0 configuration.

While the best mode for carrying out the invention has been described in detail, those familiar with the art to which this invention relates will recognize various alternative designs and embodiments for practicing the invention as defined by the following claims.

What is claimed is:

1. A satellite comprising:
a main spacecraft body; and
a solar array attached to the spacecraft body;
the solar array including, a superstructure with a plurality of solar cells mounted relative to the superstructure and a tensioning member spanning and affixed relative to the superstructure to constrain the superstructure in a distorted, bowed condition;
a tensioning device affixed relative to the superstructure tensioning said tensioning member;
said tensioning device comprising a take-up mechanism for taking up said tensioning member while preventing said tensioning member from feeding out from said tensioning device;
said take-us mechanism having a spool upon which said tensioning member is wound; and
said take-up mechanism having a ratchet and pawl for preventing the feeding out of said tensioning member from said tensioning device;
wherein thermal snap phenomenon is reduced and the bending frequency of the solar array is increased.

2. A solar array for a satellite, the solar array comprising:
a superstructure with solar cells mounted to a front side of the superstructure and a tensioning member spanning and tensilely affixed relative to a rear side of the superstructure to constrain the superstructure in a distorted, bowed condition;
a first support arm affixed relative to and extending from said superstructure, said first support arm having a distal end spaced from said superstructure; and
said tensioning member extending from said first support arm under tension thereby inducing said first support arm to transmit a first bending moment to said superstructure.

3. The solar array of claim 2 wherein:
said solar array further comprises a tensioning device which tensions said tensioning member.

4. The solar array of claim 2 further comprising:
a take-up mechanism for taking up said tensioning member while preventing said tensioning member from feeding out from the take-up mechanism.

5. The satellite of claim 4 wherein:
said take-up mechanism includes a spool upon which said tensioning member is wound.

6. The solar array of claim 2 further comprising:
a second support arm affixed relative to and extending from the said superstructure and having a distal end spaced from the said superstructure, said tensioning member extending between the said distal ends of said first and second support arms with said superstructure, first and second support arms and flexible tensile member defining an open frame structure.

7. A method for stiffening a solar array for a satellite, the method comprising:

affixing a tensioning member relative to spaced apart portions of a superstructure, said superstructure having a front surface with solar cells mounted thereon and a rear surface spaced from said front surface;
constraining said superstructure with said tensioning member to place said superstructure in a distorted, bowed condition with said front surface of said superstructure being placed in tension and said rear surface in compression;
heating said solar array causing said superstructure to thermally deform; and
taking up a portion of said tensioning member on a take-up mechanism to maintain said tensioning member in a taut condition.

8. The method of claim 7 wherein:
said solar array further includes comprises a first support arm having a proximate end affixed relative to said superstructure and a distal end spaced therefrom; and
pulling upon said distal end of said support arm with said tensioning member to induce a first moment to be transmitted from said support arm to said superstructure.

9. The method of claim 8 wherein:
said solar array includes a second support arm having a proximate end affixed relative to said superstructure and a distal end spaced therefrom; and
pulling upon said distal ends of said first and second support arms with said tensioning member to induce first and second moments to be transmitted from said support arms to said superstructure.

10. A satellite comprising:
a main spacecraft body; and
a solar array attached to the spacecraft body;
said solar array comprising a superstructure with a plurality of solar cells mounted relative to the superstructure and a tensioning member spanning and affixed relative to the superstructure to constrain the superstructure in a distorted, bowed condition;
said solar array further comprising a first support arm affixed relative to and extending from said superstructure, said first support arm having a distal end spaced from said superstructure;
said tensioning member extending from said first support arm under tension thereby inducing said first support arm to transmit a first bending moment to said superstructure;
wherein thermal snap phenomenon is reduced and the bending frequency of the solar array is increased.

11. The satellite of claim 10 wherein:
said solar array further comprises a second support arm affixed relative to and extending from said superstructure and having a distal end spaced from said superstructure, said tensioning member extending between the distal ends of said first and second support arms with said superstructure, first and second support arms and said flexible tensile member defining an open frame structure.

12. A method for stiffening a solar array for a satellite, the method comprising:
affixing a tensioning member relative to spaced apart portions of a superstructure, said superstructure having a front surface with solar cells mounted thereon and a rear surface spaced from the front surface;
constraining said superstructure with said tensioning member to place said superstructure in a distorted, bowed condition with said front surface of said superstructure being placed in tension and said rear surface in compression;

said solar array further comprising a first support arm having a proximate end affixed relative to said superstructure and a distal end spaced therefrom; and pulling upon said distal end of said support arm with said tensioning member to induce a first moment to be transmitted from said first support arm to said superstructure.

13. A method for stiffening a solar array for a satellite, the method comprising:

affixing a tensioning member relative to spaced apart portions of a superstructure, said superstructure having a front surface with solar cells mounted thereon and a rear surface spaced from the front surface;

constraining said superstructure with said tension member to place said superstructure in a distorted, bowed condition with said front surface of said superstructure being placed in tension and said rear surface in compression;

applying heat to said solar array with said solar array thermally deforming into a bowed configuration; and tensioning said tensioning member relative to said superstructure to hold said solar array in the thermally deformed bowed configuration.

* * * * *